US010989269B2

(12) United States Patent
Kojima (10) Patent No.: US 10,989,269 B2
(45) Date of Patent: Apr. 27, 2021

(54) ANTI-VIBRATION DEVICE

(71) Applicant: BRIDGESTONE CORPORATION, Tokyo (JP)

(72) Inventor: Hiroshi Kojima, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 15 days.

(21) Appl. No.: 16/332,057

(22) PCT Filed: Jul. 13, 2017

(86) PCT No.: PCT/JP2017/025566
§ 371 (c)(1),
(2) Date: Mar. 11, 2019

(87) PCT Pub. No.: WO2018/051627
PCT Pub. Date: Mar. 22, 2018

(65) Prior Publication Data
US 2019/0226549 A1 Jul. 25, 2019

(30) Foreign Application Priority Data

Sep. 16, 2016 (JP) .............................. JP2016-181613

(51) Int. Cl.
*F16F 13/10* (2006.01)
(52) U.S. Cl.
CPC ............ *F16F 13/107* (2013.01); *F16F 13/10* (2013.01); *F16F 13/106* (2013.01);
(Continued)
(58) Field of Classification Search
CPC ........ F16F 13/10; F16F 13/105; F16F 13/106; F16F 13/107; F16F 13/18
(Continued)

(56) References Cited

U.S. PATENT DOCUMENTS 4,809,959 A * 3/1989 Hourlier ................. F16F 13/10
248/565
5,499,799 A 3/1996 Kojima
(Continued)

FOREIGN PATENT DOCUMENTS

CN 101883932 A 11/2010
CN 102588502 A 7/2012
(Continued)

OTHER PUBLICATIONS

International Search Repot of PCT/JP2017/025566 dated Oct. 17, 2017.
(Continued)

*Primary Examiner* — Thomas J Williams
(74) *Attorney, Agent, or Firm* — Sughrue Mion, PLLC (57) ABSTRACT

An anti-vibration device (1) of the present invention includes a cylindrical first attaching member (11) and a second attaching member (12), an elastic body (13), and a partition member (17) which is configured to partition a liquid chamber (14) in the first attaching member into a main liquid chamber (15) and an auxiliary liquid chamber (16). The partition member includes a membrane (31) that forms a part of the partition wall of the main liquid chamber, and an intermediate chamber (35) which is located on a side opposite to the main liquid chamber with the membrane therebetween and has a membrane as a part of a partition wall of the main liquid chamber. In the partition member, a first orifice (21) through which the main liquid chamber and the auxiliary liquid chamber communicate with each other, and a second orifice (22) through which the intermediate chamber and the auxiliary liquid chamber communicate with each other, and a common opening (16a) which forms an opening on the auxiliary liquid chamber side of each of the first orifice (21) and the second orifice (22) are formed.

3 Claims, 3 Drawing Sheets

(52) U.S. Cl.
CPC ..... *F16F 2224/025* (2013.01); *F16F 2224/04* (2013.01); *F16F 2232/08* (2013.01); *F16F 2238/04* (2013.01)

(58) Field of Classification Search
USPC .......................... 267/140.13, 140.14, 140.15
See application file for complete search history.

(56) References Cited

U.S. PATENT DOCUMENTS

| | | | | |
|---|---|---|---|---|
| 5,769,402 | A | * | 6/1998 | Ide .................. F16F 13/264 267/140.14 |
| 6,257,562 | B1 | | 7/2001 | Takashima et al. |
| 2007/0013115 | A1 | * | 1/2007 | Katagiri ............. F16F 13/106 267/140.13 |
| 2010/0213650 | A1 | | 8/2010 | Katayama et al. |
| 2013/0112839 | A1 | | 5/2013 | Kato et al. |

FOREIGN PATENT DOCUMENTS

| | | | |
|---|---|---|---|
| CN | 103089910 | A | 5/2013 |
| JP | 05272575 | A * | 10/1993 |
| JP | 07-113435 | A | 5/1995 |
| JP | 08-004823 | A | 1/1996 |
| JP | 10-132017 | A | 5/1998 |
| JP | 2001-020992 | A | 1/2001 |
| JP | 2006-071109 | A | 3/2006 |
| JP | 2007-120607 | A | 5/2007 |
| JP | 2010-174998 | A | 8/2010 |
| JP | 2010-196874 | A | 9/2010 |

OTHER PUBLICATIONS

Search Report dated Mar. 20, 2020. from the State Intellectual Property Office of the P.R.C in application No. 201780055475.2.

* cited by examiner

ANTI-VIBRATION DEVICE

TECHNICAL FIELD

The present invention relates to an anti-vibration device.
Priority is claimed on Japanese Patent Application No. 2016-181613, filed Sep. 16, 2016, the content of which is incorporated herein by reference.

BACKGROUND ART

An anti-vibration device, as disclosed in the following Patent Document 1, is known from the related art. The anti-vibration device includes a cylindrical first attaching member connected to one of a vibration generation unit and a vibration reception unit, a second attaching member connected to the other thereof, an elastic body that connects the first attaching member and the second attaching member, and a partition member that partitions a liquid chamber in the first attaching member into a main liquid chamber having the elastic body as a part of a partition wall and an auxiliary liquid chamber. The partition member is provided with a membrane which forms a part of the partition wall of the main liquid chamber, and an intermediate chamber located on a side opposite to the main liquid chamber with the membrane sandwiched therebetween and having the membrane as a part of the partition wall. Further, in the partition member, a first orifice through which the main liquid chamber and the auxiliary liquid chamber communicate with each other, and a second orifice through which the intermediate chamber and the auxiliary liquid chamber communicate with each other are formed.

In the anti-vibration device, at the time of vibration input, the two attaching members are displaced relative to each other, while elastically deforming the elastic body, and the liquid pressure in the main liquid chamber varies which causes the liquid to flow through the first orifice and the second orifice, thereby absorbing and damping the vibration.

CITATION LIST

Patent Document

[Patent Document 1]
Japanese Unexamined Patent Application, First Publication No. Hei 8-4823

SUMMARY OF INVENTION

Technical Problem

Meanwhile, in the anti-vibration device configured as described above, there is a likelihood that cavitation will occur due to an increase in a flow velocity or a flow rate of liquid flowing from the auxiliary liquid chamber to the main liquid chamber through the first orifice.

The present invention has been made in view of the above circumstances, and an object thereof is to curtail occurrence of cavitation in an anti-vibration device having two orifices.

Solution to Problem

An anti-vibration device of the present invention includes a cylindrical first attaching member connected to one of a vibration generation unit and a vibration reception unit, and a second attaching member connected to the other thereof; an elastic body which connects the first attaching member and the second attaching member; and a partition member which is configured to partition a liquid chamber in the first attaching member into a main liquid chamber having the elastic body as a part of a partition wall of the main liquid chamber and an auxiliary liquid chamber. The partition member includes a membrane which forms a part of the partition wall of the main liquid chamber, and an intermediate chamber which is located on a side opposite to the main liquid chamber with the membrane interposed therebetween, and has the membrane as a part of the partition wall of the main liquid chamber. In the partition member, a first orifice through which the main liquid chamber and the auxiliary liquid chamber communicate with each other, a second orifice through which the intermediate chamber and the auxiliary liquid chamber communicate with each other, and a common opening which forms an opening on the auxiliary liquid chamber side of each of the first orifice and the second orifice are formed.

Effects of Invention

According to the present invention, it is possible to suppress occurrence of cavitation in the anti-vibration device having two orifices.

DESCRIPTION OF EMBODIMENTS

First Embodiment

Hereinafter, a configuration of an anti-vibration device according to the first embodiment will be described with reference to FIGS. 1 to 3.

Figure 1:
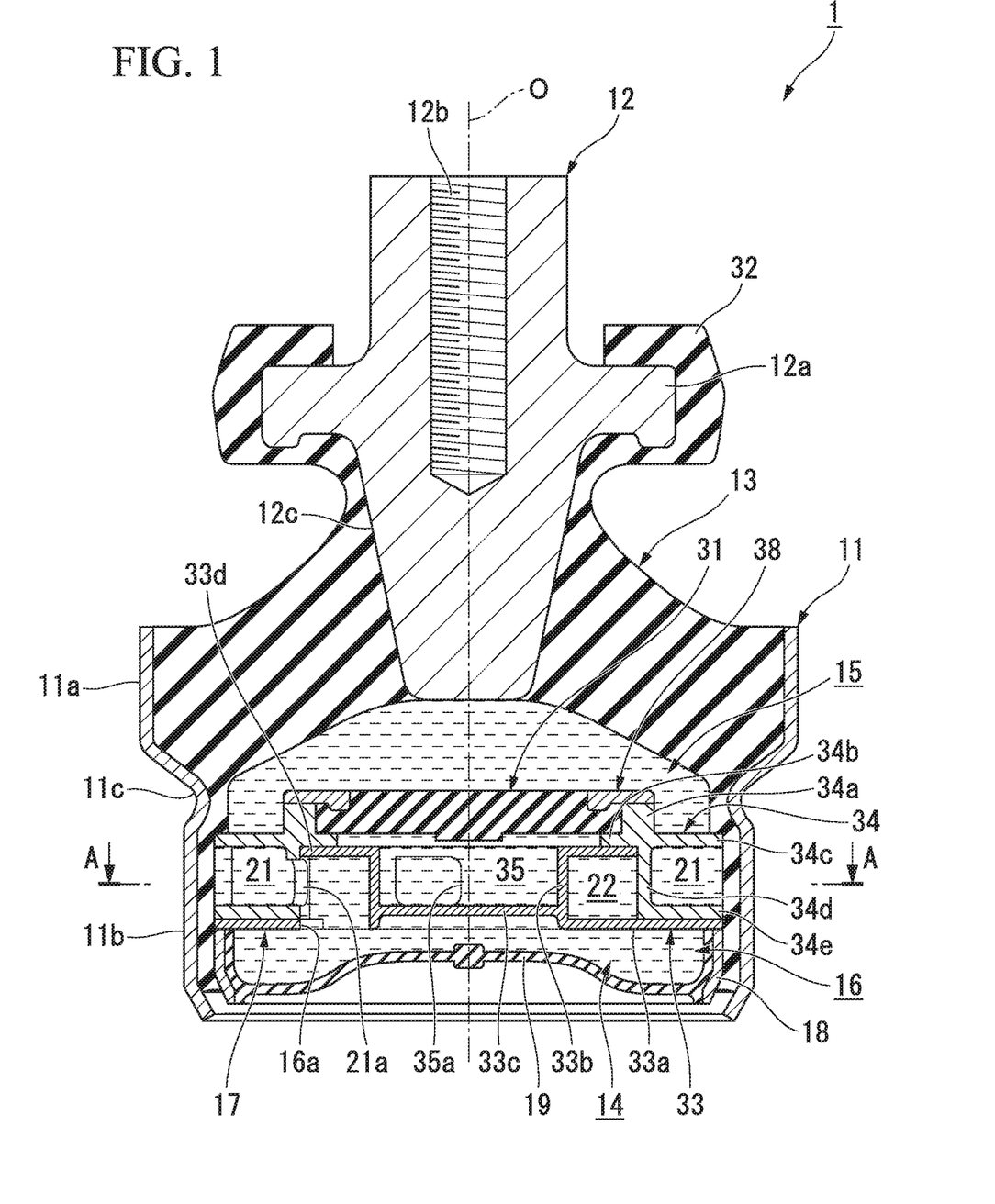
FIG. 1 is a vertical sectional view of an anti-vibration device according to a first embodiment.
Figure 2:
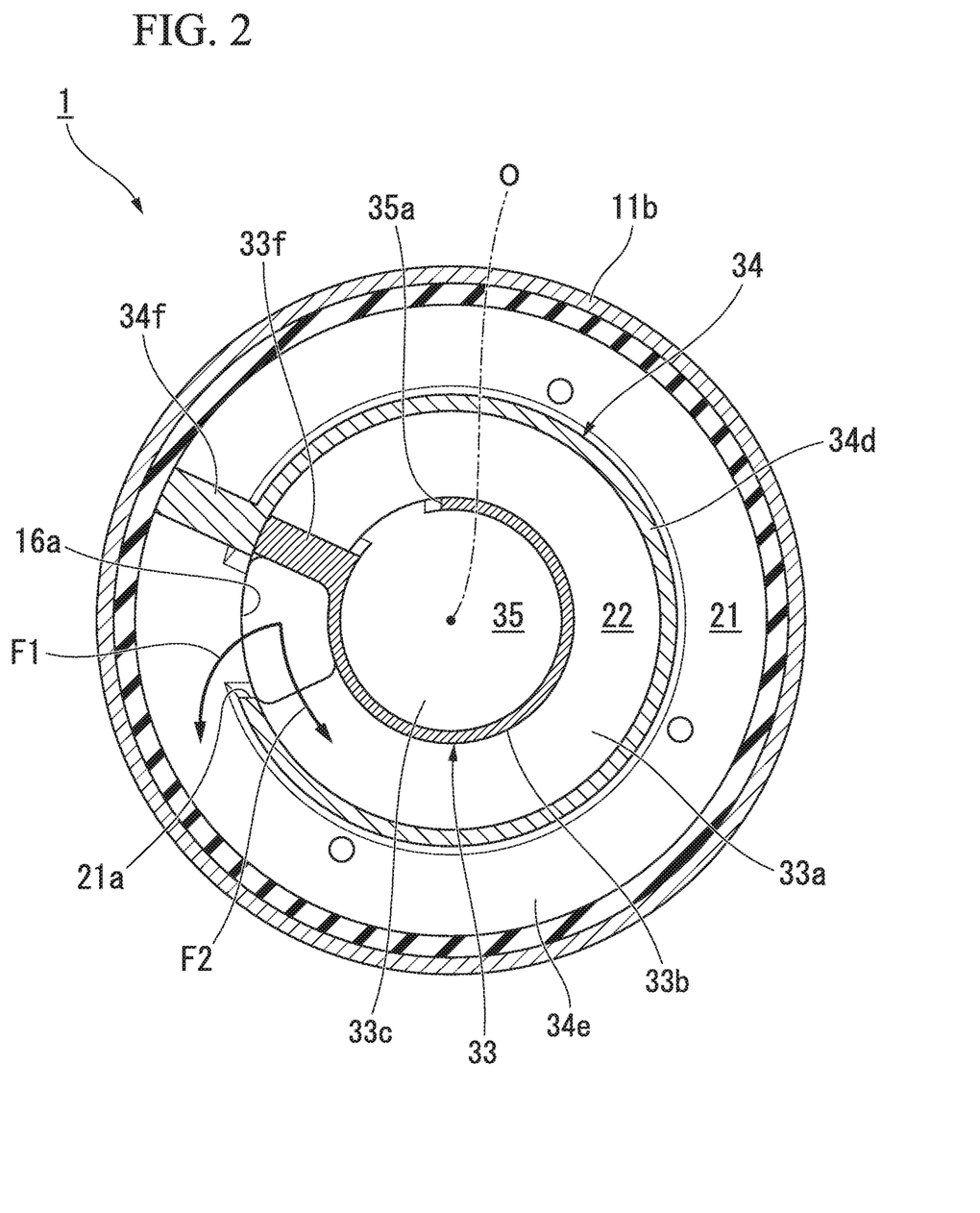
FIG. 2 is a cross-sectional view taken along line A-A of the anti-vibration device of FIG. 1.

As shown in FIG. 1, an anti-vibration device 1 includes a cylindrical first attaching member 11 connected to one of a vibration generation unit and a vibration reception unit, a second attaching member 12 attached to the other thereof, an elastic body 13 which connects the first attaching member 11 and the second attaching member 12, and a partition member 17 which is configured to partition a liquid chamber 14 in the first attaching member 11 having liquid sealed therein into a main liquid chamber 15 having the elastic body 13 as a part of a partition wall, and an auxiliary liquid chamber 16 in an axial direction along a central axis O of the first attaching member 11.

In a case in which the anti-vibration device 1 is used for, for example, an engine mounting for an automobile, the first attaching member 11 is connected to a vehicle body as a vibration reception unit, and the second attaching member 12 is connected to an engine as a vibration generation unit. As a result, transmission of vibration of the engine to the vehicle body is prevented.

Here, in this embodiment, the main liquid chamber 15 side in the axial direction with respect to the partition member 17 is referred to as an upper side, and the auxiliary liquid chamber 16 side is referred to as a lower side. Also, in a plan view of the anti-vibration device 1 as viewed from the axial direction, a direction orthogonal to the central axis O is referred to as a radial direction, and a direction of revolution around the central axis O is referred to as a circumferential direction.

The first attaching member 11 includes an upper cylinder portion 11a located on the upper side, a lower cylinder portion 11b having an inner diameter and an outer diameter smaller than the upper cylinder portion 11a and located on the lower side, and a throttle portion 11c which connects the upper cylinder portion 11a and the lower cylinder portion 11b and continuously extends over the entire circumference. An inner circumferential surface of the lower cylinder portion 11b is covered with coating rubber. The coating rubber is integrally formed with the elastic body 13.

The second attaching member 12 is formed in a rod shape and is disposed coaxially with the central axis O. The second attaching member 12 is disposed on the side inward from the first attaching member 11 in the radial direction. A flange portion 12a protruding outward in the radial direction is formed in an axial center portion of the second attaching member 12. A female screw portion 12b extending downward in the axial direction is formed on an upper end surface of the second attaching member 12. In a portion of the second attaching member 12 located below the flange portion 12a, a tapered portion 12c which gradually decreases in diameter toward the lower side is formed. The flange portion 12a is located above the first attaching member 11. The lower end portion of the second attaching member 12 is located below an upper end opening edge of the first attaching member 11.

The elastic body 13 connects the upper cylinder portion 11a of the first attaching member 11 and the tapered portion 12c of the second attaching member 12. The outer circumferential side of the elastic body 13 is integrally bonded by vulcanization to the respective inner circumferential surfaces of the upper cylinder portion 11a and the throttle portion 11c of the first attaching member 11. The inner circumferential side of the elastic body 13 is bonded by vulcanization to the outer circumferential surface of the tapered portion 12c of the second attaching member 12. The elastic body 13 gradually extends upward from the outer side in the radial direction to the inner side. An upper end opening portion of the first attaching member 11 is hermetically sealed by the elastic body 13.

The elastic body 13 is integrally formed with a stopper rubber 32 which integrally covers the upper surface, the lower surface, and the outer circumferential surface of the flange portion 12a of the second attaching member 12.

A cylindrical diaphragm ring 18 is liquid-tightly fitted into the lower end portion of the first attaching member 11 via the coating rubber. An outer circumferential portion of a diaphragm 19 formed to be elastically deformable using a rubber material or the like is bonded by vulcanization to the inner circumferential surface of the diaphragm ring 18. The diaphragm ring 18 is fixed to the first attaching member 11 by crimping the lower end portion of the first attaching member 11 inward in the radial direction. The diaphragm 19 seals the lower end opening portion of the first attaching member 11.

A liquid chamber 14 in which the liquid is sealed is defined in the first attaching member 11 by the diaphragm 19 and the elastic body 13. As the liquid sealed in the liquid chamber 14, for example, water, ethylene glycol, or the like can be used.

The partition member 17 is formed in a flat disc shape. The partition member 17 is fitted into the first attaching member 11 and is sandwiched between the throttle portion 11c of the first attaching member 11 and the diaphragm ring 18 in the axial direction. As a result, the liquid chamber 14 in the first attaching member 11 is partitioned into the main liquid chamber 15 defined by the elastic body 13 and the partition member 17, and the auxiliary liquid chamber 16 defined by the diaphragm 19 and the partition member 17. The diaphragm 19 is deformed to expand and contract with inflow and outflow of the liquid into and out of the auxiliary liquid chamber 16.

The partition member 17 includes a membrane 31 forming a part of the partition wall of the main liquid chamber 15, an upper member 34 surrounding the membrane 31, a lower member 33 fitted in the upper member 34, an annular fixing member 38 which fixes the membrane 31 to the upper member 34, and an intermediate chamber 35 having the membrane 31 as a part of the partition wall.

The membrane 31 is formed in a disc shape by an elastic member such as rubber. The intermediate chamber 35 is located on the side opposite to the main liquid chamber 15 across the membrane 31. No penetrating hole is formed in the membrane 31 of the present embodiment.

The upper member 34 has a fixed cylinder portion 34a surrounding the membrane 31, an annular fixing flange 34b protruding inward in the radial direction from the lower end opening edge of the fixed cylinder portion 34a, an annular upper flange 34c protruding outward in the radial direction from the lower end opening edge of the fixed cylinder portion 34a, an outer cylinder portion 34d extending downward from the fixed cylinder portion 34a, and a lower flange 34e protruding outward in the radial direction from the lower end opening edge of the outer cylinder portion 34d.

The upper flange 34c and the lower flange 34e are fitted in the lower cylinder portion 11b via coating rubber.

The fixing member 38 is placed on the upper surface of the fixed cylinder portion 34a of the upper member 34, and is fixed to the upper member 34 by a bolt (not shown) or the like. As a result, the outer circumferential edge portion of the membrane 31 is fixed by being interposed in the axial direction between the fixing member 38 and the upper member 34. Therefore, with the inflow and outflow of the liquid into the main liquid chamber 15, the membrane 31 can elastically deform with the outer circumferential edge portion as the fixed end.

The lower member 33 is fitted into the outer cylinder portion 34d of the upper member 34. The lower member 33 includes an annular bottom plate portion 33a, an inner cylinder portion 33b extending upward from the inner circumferential edge of the bottom plate portion 33a, a first blocking portion 33c for closing the lower end portion of the inner cylinder portion 33b, and an upper plate portion 33d extending outward in the radial direction from the upper end opening edge of the inner cylinder portion 33b.

The outer circumferential edge of the bottom plate portion 33a is fitted in the lower cylinder portion 11b via the coating rubber. The bottom plate portion 33a is in contact with or in proximity to the lower flange 34e of the upper member 34. The inner cylinder portion 33b is disposed on the inner side of the outer cylinder portion 34d in the radial direction. The first blocking portion 33c is located above the bottom plate portion 33a.

Here, the partition member 17 of the present embodiment is provided with a first orifice 21 through which the main liquid chamber 15 and the auxiliary liquid chamber 16 communicate with each other, a second orifice 22 through which the intermediate chamber 35 and the auxiliary liquid chamber 16 communicate with each other, and a common opening 16a which forms an opening of each of the first orifice 21 and the second orifice 22 on the auxiliary liquid chamber 16 side.

The flow resistances of the first orifice 21 and the second orifice 22 are different from each other. The second orifice 22 has a shorter flow path length and a greater cross-sectional area of the flow path than the first orifice 21, and has a smaller flow resistance than that of the first orifice 21. The flow path length and the flow path cross-sectional area of the first orifice 21 and the second orifice 22 are tuned so that the resonance frequency of each orifice becomes a predetermined frequency.

The resonance frequencies of the first orifice 21 and the second orifice 22 may be equal to each other.

The first orifice 21 is defined by the upper flange 34c, the outer cylinder portion 34d and the lower flange 34e of the upper member 34, and the coating rubber on the inner circumferential surface of the lower cylinder portion 11b. As shown in FIG. 2, the first orifice 21 and the second orifice 22 each extend in the circumferential direction. One end portion of the first orifice 21 communicates with the common opening 16a through a first opening 21a formed in the outer cylinder portion 34d. The other end portion of the first orifice 21 communicates with the main liquid chamber 15 through an opening (not shown) on the main liquid chamber side formed in the upper flange 34c.

The first orifice 21 is formed in a C-shape in a cross-sectional view orthogonal to the axial direction, and a part thereof in the circumferential direction is blocked by an outer partition wall 34f protruding outward in the radial direction from the outer cylinder portion 34d.

The second orifice 22 is disposed on the side inward from the first orifice 21 in the radial direction. As shown in FIG. 1, the second orifice 22 is defined by a bottom plate portion 33a, an inner cylinder portion 33b and an upper plate portion 33d of the lower member 33, and an outer cylinder portion 34d of the upper member 34. As shown in FIG. 2, one end portion of the second orifice 22 communicates with the intermediate chamber 35 through a second opening 35a formed in the inner cylinder portion 33b. The other end portion of the second orifice 22 communicates with the auxiliary liquid chamber 16 through the common opening 16a.

The second orifice 22 is formed in a C-shape in the cross-sectional view, and a part thereof in the circumferential direction is blocked by the inner partition wall 33f protruding outward in the radial direction from the inner cylinder portion 33b. The inner partition wall 33f and the outer partition wall 34f are formed at the same position in the circumferential direction. The radially outer end surface of the inner partition wall 33f and the radially inner end surface of the outer partition wall 34f are in contact with or in proximity to each other in the radial direction.

As shown in FIG. 1, the intermediate chamber 35 is defined by the inner cylinder portion 33b and the first blocking portion 33c of the lower member 33, and the membrane 31. With the inflow and outflow of the liquid through the second orifice 22 and the second opening 35a with respect to the intermediate chamber 35, the membrane 31 deforms in the axial direction with the outer circumferential edge as the fixed end.

The common opening 16a is formed on the wall surface of the bottom plate portion 33a that defines the inner surface of the second orifice 22, in the partition member 17. As shown in FIG. 2, the common opening 16a is disposed at a position adjacent to the inner partition wall 33f and the first opening 21a.

Next, the operation of the anti-vibration device 1 configured as described above will be described.

When vibration in the axial direction is input to the anti-vibration device 1 and the first attaching member 11 and the second attaching member 12 are relatively displaced in the axial direction, the elastic body 13 which connects the first attaching member 11 and the second attaching member 12 to each other is elastically deformed. Next, the internal volume of the main liquid chamber 15 changes, liquid flows back and forth through the first orifice 21 and the second orifice 22, liquid column resonance occurs in each orifice, and the vibration is attenuated and absorbed.

For example, when idle vibration having a relatively small amplitude in the axial direction and a relatively high frequency is input to the anti-vibration device 1, the membrane 31 elastically deforms, and the liquid flows back and forth between the auxiliary liquid chamber 16 and the intermediate chamber 35 through the second orifice 22. At this time, liquid column resonance occurs in the second orifice 22, and the vibration is attenuated and absorbed. Further, when shear vibration having a relatively large amplitude in the axial direction and a relatively small frequency is input to the anti-vibration device 1, the elastic body 13 is elastically deformed, and the liquid flows back and forth between the main liquid chamber 15 and the auxiliary liquid chamber 16 through the first orifice 21. At this time, liquid column resonance occurs in the first orifice 21, and the vibration is attenuated and absorbed.

Here, when vibration having an amplitude larger than shake vibration is input to the anti-vibration device 1, after the first attaching member 11 is greatly displaced downward with respect to the second attaching member 12, when the restoring displacement is made to the upper side due to elasticity or the like of the elastic body 13, a large negative pressure is generated in the main liquid chamber 15. Due to the negative pressure, the liquid in the auxiliary liquid chamber 16 flows rapidly into the partition member 17 from the common opening 16a. At this time, as shown in FIG. 2, the flow of the liquid having passed through the common opening 16a diverges into a flow F1 flowing in the first orifice 21 through the first opening 21a, and a flow F2 flowing in the second orifice 22. Further, the intermediate chamber 35 communicating with the auxiliary liquid chamber 16 via the second orifice 22 is separated from the main liquid chamber 15 by the membrane 31.

Thus, according to the anti-vibration device 1 of the present embodiment, as compared with a case in which the first orifice 21 and the second orifice 22 communicate with the auxiliary liquid chamber 16 through different openings, the flow velocity and the flow rate of the liquid flowing into the main liquid chamber 15 through the first orifice 21 are suppressed, and occurrence of cavitation can be suppressed.

Furthermore, since the common opening 16a is formed on the wall surface of the second orifice 22 disposed on the inner side than the first orifice 21 in the radial direction, the flow of the liquid flowing from the auxiliary liquid chamber 16 into the partition member 17 through the common opening 16a can be made to more reliably diverge into the flow F1 flowing in the first orifice 21 and the flow F2 flowing in the second orifice 22. Therefore, it is possible to more reliably reduce the flow velocity and the flow rate of the liquid flowing into the main liquid chamber 15, and to suppress the occurrence of cavitation.

Second Embodiment

Next, a second embodiment of the present invention will be described with reference to FIG. 3, but the basic configuration is the same as that of the first embodiment. For this reason, components which are the same are denoted by the same reference numerals, the explanation thereof will be omitted, and only differences will be described.

The anti-vibration device 10 of the present embodiment differs from the anti-vibration device 10 of the first embodiment in that a movable member 36 is accommodated in an accommodating chamber 37 provided in the partition member 17 to be deformable or displaceable in the axial direction.

Figure 3:
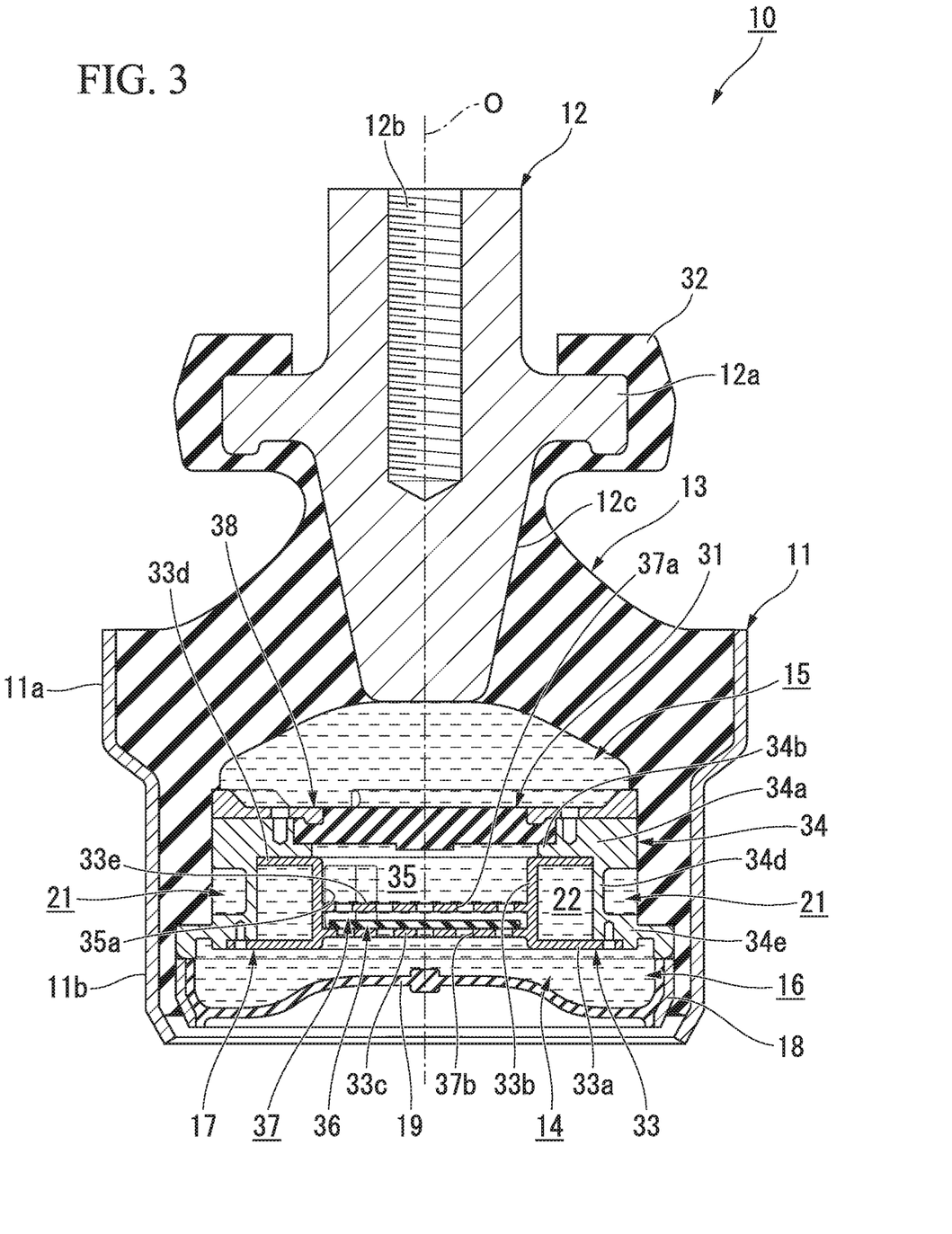
FIG. 3 is a vertical cross-sectional view of an anti-vibration device according to a second embodiment.

As shown in FIG. 3, in the lower member 33 of the partition member 17 of the present embodiment, a second blocking portion 33e which blocks the axial center portion of the inner cylinder portion 33b is formed on the side above the first blocking portion 33c at an interval therefrom. The aforementioned accommodating chamber 37 is defined by the first blocking portion 33c, the second blocking portion 33e, and the inner cylinder portion 33b. Further, the intermediate chamber 35 of the present embodiment is defined by the second blocking portion 33e, the inner cylinder portion 33b, and the membrane 31. The accommodating chamber 37 is disposed below the intermediate chamber 35 with the second blocking portion 33e interposed therebetween.

Further, in the upper member 34 of the present embodiment, the fixed cylinder portion 34a extends toward the side outward from the outer cylinder portion 34d in the radial direction, and the portion in the lower surface of the fixed cylinder portion 34a on the outer side than the outer cylinder portion 34d in the radial direction defines the first orifice 21.

The fixing member 38 and the lower member 33 are fixed to the upper member 34 with a bolt.

Further, in the first blocking portion 33c of this embodiment, a plurality of first communication holes 37b penetrating the first blocking portion 33c in the axial direction are formed at intervals in the radial direction and the circumferential direction. The plurality of first communication holes 37b allow the accommodating chamber 37 and the auxiliary liquid chamber 16 to communicate with each other. In the second blocking portion 33e, a plurality of second communication holes 37a penetrating the second blocking portion 33e in the axial direction are formed at intervals in the radial direction and the circumferential direction. The plurality of second communication holes 37a allow the accommodating chamber 37 and the intermediate chamber 35 to communicate with each other. The plurality of first communication holes 37b and the plurality of second communication holes 37a are formed on the wall surface defining the accommodating chamber 37.

The plurality of second communication holes 37a and the plurality of first communication holes 37b are formed at equivalent positions in the radial direction and the circumferential direction. The flow resistance of each of the plurality of second communication holes 37a and the plurality of first communication holes 37b is smaller than the flow resistance of the first orifice 21 and the second orifice 22.

The movable member 36 is formed in a disc shape of an elastic member such as rubber. The outer diameter of the movable member 36 is smaller than the inner diameter of the inner cylinder portion 33b, and the thickness of the movable member 36 is smaller than an axial distance between the first blocking portion 33c and the second blocking portion 33e. Therefore, a gap in the radial direction and the axial direction is formed between the movable member 36 and the inner surface of the accommodating chamber 37.

According to the anti-vibration device 10 of the present embodiment, since the first communication hole 37b and the second communication hole 37a are formed on the wall surface of the accommodating chamber 37, when vibration is input to the anti-vibration device 10, the fluid flows into and out of the accommodating chamber 37 through the communication holes 37a and 37b.

Here, since the movable member 36 deformable or displaceable in the axial direction is accommodated in the accommodating chamber 37, in the case in which the amplitude of vibration is relatively large and the frequency is relatively small, because a momentum of the flow of the liquid flowing into the accommodating chamber 37 is strong, the movable member 36 is strongly pressed against the wall surface of the accommodating chamber 37. As a result, since the first communication hole 37b or the second communication hole 37a is blocked, it is possible to restrict flow of the liquid between the intermediate chamber 35 and the auxiliary liquid chamber 16 through the accommodating chamber 37 and to increase the dynamic spring constant of the entire anti-vibration device 10. Therefore, it is possible to effectively attenuate vibrations of large amplitude.

On the other hand, when an idle vibration or the like having a relatively small vibration amplitude and a relatively large frequency is input to the anti-vibration device 10, because the momentum of the flow of the liquid flowing into and out of the accommodating chamber 37 is relatively weak, the first communication hole 37b and the second communication hole 37a are not blocked by the movable member 36 and are released. Thus, it is possible to allow the liquid to flow between the intermediate chamber 35 and the auxiliary liquid chamber 16 through the accommodating chamber 37 and to reduce the dynamic spring constant of the entire anti-vibration device 10 such that it becomes small. This makes it possible to effectively attenuate vibration of a small amplitude.

As described above, according to the anti-vibration device 10 of the present embodiment, it is possible to effectively attenuate both vibration having large amplitude and vibration having small amplitude.

It should be noted that the technical scope of the present invention is not limited to the above-described embodiments, and various modifications can be made without departing from the spirit of the present invention.

For example, in the partition member 17 in the first embodiment, fine holes which penetrate the first blocking portion 33c shown in FIG. 1 in the axial direction and allow the intermediate chamber 35 and the auxiliary liquid chamber 16 to communicate with each other may be formed. In this case, when the amplitude of the vibration which is input to the anti-vibration device 1 is relatively large and the frequency is relatively small, since it is made difficult for the liquid to flow through the fine holes, it is possible to suppress flow of the liquid between the intermediate chamber 35 and the auxiliary liquid chamber 16 and to increase the dynamic spring constant of the entire anti-vibration device 1. On the other hand, when the amplitude of the vibration which is input to the anti-vibration device 1 is relatively small and the frequency is relatively large, the liquid relatively easily flows through the fine holes, flowing of the liquid between the intermediate chamber 35 and the auxiliary liquid chamber 16 is not suppressed, and the dynamic spring constant of the entire anti-vibration device 1 can be suppressed to be small. Thus, with a simple configuration, as in the anti-vibration device 10 of the second embodiment, it is possible to effectively attenuate both vibration with large amplitude and vibration with small amplitude.

In addition, the outer circumferential edge of the movable member 36 in the second embodiment may be fixed to the accommodating chamber 37. In this case, since the movable member 36 is deformed in the axial direction with the outer circumferential edge as the fixed end, it is possible to stabilize the state of deformation of the movable member 36 due to the vibration which is input to the anti-vibration device 10. Further, the movable member 36 may be have a penetration hole penetrating the movable member 36 in the axial direction formed therein.

Further, in the first embodiment and the second embodiment, the common opening 16a may be formed on a wall surface which defines the inner surface of the first orifice 21.

In addition, in the first embodiment and the second embodiment, the partition member 17 is formed with two orifices 21 and 22, but the present invention is not limited thereto, and a partition member 17 having three or more orifices formed thereon may be formed. In this case, the partition member 17 may have a common opening 16a on the side of the auxiliary liquid chamber 16 of two orifices among three or more orifices, or may have a common opening 16a on the side of the auxiliary liquid chamber 16 of three or more orifices.

According to the anti-vibration device of the present invention, since each of the first orifice and the second orifice communicates with the auxiliary liquid chamber through the common opening, when vibration having a relatively large amplitude and a relatively small frequency is input to the anti-vibration device and the main liquid chamber reaches a negative pressure, the flow of the liquid in the auxiliary liquid chamber having passed through the common opening diverges into the first orifice and the second orifice. Further, the intermediate chamber communicating with the auxiliary liquid chamber via the second orifice is separated from the main liquid chamber by the membrane.

As a result, for example, since the flow velocity and the flow rate of the liquid flowing into the main liquid chamber through the first orifice are suppressed as compared with the case in which the first orifice and the second orifice communicate with the auxiliary liquid chamber through openings different from each other, occurrence of cavitation can be suppressed.

Here, each of the first orifice and the second orifice extends in the circumferential direction, the second orifice is disposed on the inner side than the first orifice in the radial direction, and the common opening may be formed on a wall surface that defines an inner surface of the second orifice, in the partition member.

In this case, since the common opening is formed on the wall surface of the second orifice disposed on the inner side than the first orifice in the radial direction, the flow of the liquid flowing out from the auxiliary liquid chamber through the common opening can be made to more reliably diverge into a flow flowing in the first orifice and a flow flowing in the second orifice. Therefore, the flow velocity and the flow rate of the liquid flowing into the main liquid chamber can be more reliably reduced, and the occurrence of cavitation can be suppressed.

Further, the partition member is provided with an accommodating chamber that accommodates a movable member that is accommodated to be deformable or displaceable in the axial direction of the first attaching member, and on a wall surface that defines the accommodating chamber, a first communication hole through which the accommodating chamber and the auxiliary liquid chamber communicate with each other, and a second communication hole through which the accommodating chamber and the intermediate chamber communicate with each other may be formed.

In this case, since the first communication hole through which the accommodating chamber and the auxiliary liquid chamber communicate with each other, and the second communication hole through which the accommodating chamber and the intermediate chamber communicate with each other are formed on the wall surface of the accommodating chamber provided in the partition member, when vibration is input to the anti-vibration device, liquid flows into and out of the accommodating chamber through each communication hole.

Here, since the movable member that is deformable or displaceable in the axial direction is accommodated in the accommodating chamber, when the amplitude of the vibration which is input to the anti-vibration device is relatively large and the frequency is relatively small, because the momentum of the flow of the liquid flowing into the accommodating chamber is strong, the movable member is strongly pressed against the wall surface of the accommodating chamber, and because the first communication hole or the second communication hole is blocked, it is possible to restrict the flowing of the liquid between the intermediate chamber and the auxiliary liquid chamber through the accommodating chamber to increase the dynamic spring constant of the entire anti-vibration device. This makes it possible to effectively attenuate vibrations with large amplitude.

On the other hand, when the amplitude of the vibration which is input to the anti-vibration device is relatively small and the frequency is relatively large, since the momentum of the flow of the liquid flowing in and out of the accommodating chamber becomes relatively weak, the first communication hole and the second communication hole are not blocked by the movable member, and the liquid flows to allow the liquid to flow between the intermediate chamber and the auxiliary liquid chamber through the accommodating chamber, thereby suppressing the dynamic spring constant of the entire anti-vibration device to be small. This makes it possible to effectively attenuate vibrations with small amplitude.

As described above, according to the anti-vibration device having such a configuration, it is possible to effectively attenuate both vibration having large amplitude and vibration having small amplitude.

Further, in the partition member, fine holes for allowing the intermediate chamber and the auxiliary liquid chamber to communicate with each other may be formed.

In this case, when the amplitude of the vibration which is input to the anti-vibration device is relatively large and the frequency is relatively small, because the liquid is hard to flow through the fine holes formed in the partition member, it is possible to suppress flow of the liquid between the intermediate chamber and the auxiliary liquid chamber to increase the dynamic spring constant of the entire anti-vibration device.

On the other hand, when the amplitude of the vibration which is input to the anti-vibration device is relatively small and the frequency is relatively large, because the liquid flows relatively easily through the fine holes, flow of the liquid between the intermediate chamber and the auxiliary liquid chamber is not suppressed, and it is possible to suppress the dynamic spring constant of the entire anti-vibration device to be small.

As described above, according to the anti-vibration device of the present invention, it is possible to effectively attenuate both vibration with large amplitude and vibration with small amplitude with a simple configuration.

Furthermore, it is possible to appropriately replace the constituent elements in the above-described embodiment with well-known constituent elements within the scope that does not depart from the gist of the present invention, and the above-described embodiment and modifications may be appropriately combined.

INDUSTRIAL APPLICABILITY

According to the present invention, occurrence of cavitation can be suppressed in an anti-vibration device having two orifices.

REFERENCE SIGNS LIST 1, 10 Anti-vibration device
11 First attaching member
12 Second attaching member
13 Elastic body
14 Liquid chamber
15 Main liquid chamber
16 Auxiliary liquid chamber
16a Common opening
17 Partition member
19 Diaphragm
21 First orifice
22 Second orifice
31 Membrane
35 Intermediate chamber
36 Movable member
37 Accommodating chamber
37a Second communication hole
37b First communication hole

What is claimed is:

1. An anti-vibration device comprising:
a cylindrical first attaching member connected to one of a vibration generation unit and a vibration reception unit, and a second attaching member connected to the other thereof;
an elastic body which connects the first attaching member and the second attaching member; and
a partition member which is configured to partition a liquid chamber in the first attaching member into a main liquid chamber having the elastic body as a part of a partition wall of the main liquid chamber and an auxiliary liquid chamber,
wherein the partition member includes
a membrane which forms a part of the partition wall of the main liquid chamber, and
an intermediate chamber which is located on a side opposite to the main liquid chamber with the membrane interposed therebetween, and has the membrane as a part of the partition wall of the main liquid chamber, in the partition member,
a first orifice through which the main liquid chamber and the auxiliary liquid chamber communicate with each other,
a second orifice through which the intermediate chamber and the auxiliary liquid chamber communicate with each other, and
a common opening which forms a single opening, the single opening which forms an opening on the auxiliary liquid chamber side of the first orifice, and the single opening which forms an opening on the auxiliary liquid chamber side of the second orifice,
are formed,
each of the first orifice and the second orifice extends in a circumferential direction, and the second orifice is disposed on an inner side of the first orifice in a radial direction,
the common opening is formed on a wall surface defining an inner surface of the second orifice in the partition member,
the partition member includes an inner partition wall that blocks a part of the second orifice in the circumferential direction, and a first opening that communicates the first orifice with the common opening, and
the common opening is disposed at a position adjacent to the inner partition wall and the first opening.

2. The anti-vibration device according to claim 1, wherein the partition member is provided with an accommodating chamber which accommodates a movable member accommodated to be deformable or displaceable in an axial direction of the first attaching member, and
a first communication hole through which the accommodating chamber and the auxiliary liquid chamber communicate with each other, and a second communication hole through which the accommodating chamber and the intermediate chamber communicate with each other are formed on the wall surface defining the accommodating chamber.

3. The anti-vibration device according to claim 1, wherein a plurality of holes through which the intermediate chamber and the auxiliary liquid chamber communicate with each other are formed in the partition member.

* * * * *